No. 779,797.

Patented January 10, 1905.

UNITED STATES PATENT OFFICE.

WILHELM OSTWALD AND OSCAR GROS, OF LEIPSIC, GERMANY.

REPRODUCING PICTURES BY MEANS OF CATALYSIS.

SPECIFICATION forming part of Letters Patent No. 779,797, dated January 10, 1905.

Application filed December 9, 1903. Serial No. 184,481.

*To all whom it may concern:*

Be it known that we, WILHELM OSTWALD, doctor of philosophy and professor, and OSCAR GROS, doctor of philosophy, subjects of the German Emperor, and residents of Leipsic, in the Kingdom of Saxony, German Empire, have invented new and useful Improvements in Reproducing Pictures or the Like by Means of Catalysis, of which the following is a full, clear, and exact specification.

This invention relates to a process of reproducing pictures by means of catalytic action.

The invention consists of the process of reproducing pictures which comprises the steps of bringing a catalytic agent into contact with one factor of a coagulant of glutinous matter, bringing portions of said factor not catalytically affected into reaction with the other factor of said coagulant, and subjecting glutinous matter to the action of the reaction product.

The improvement depends on the fact that when the picture in hydrogen peroxid is brought into a solution of glutinous matter like glue, gum-arabic, gelatin, albumin, or the like, mixed with a substance or substances which reacts or react with hydrogen peroxid to form a product or products that coagulate glue, gum-arabic, gelatin, or albumin, it is possible to produce such coagulation at those parts of the picture which contain hydrogen peroxid. There is thus obtained a picture of coagulated glue or the like which when produced upon a differently-colored surface will be visible thereon or when produced upon a similarly-colored surface can be made visible, as hereinafter described.

By mixing the solution of the glutinous substance with a coloring-matter the latter will be fixed on those parts where the glue has been coagulated and a pigmented picture will be obtained. By using a catalytic negative there may be obtained in this manner a positive. The method may be used, however, for obtaining from a catalytic positive a positive picture, for there may be employed as substratum a colored paper, while the glue is mixed with a bright color. Furthermore, the picture in glue or the like can be made visible by treatment with such substances as yield colors, with the glue, or with the material that causes the coagulation.

Both methods may be combined by adding coloring-matter to the glue solution before coagulation and subsequently treating the picture with substances that yield colors with the coagulating material. There may thus be obtained mixed colors.

Example I: We pour a solution of hydrogen peroxid over a platinum print. For instance, an ethereal solution may be used, which is obtained by agitating an aqueous solution of hydrogen peroxid of thirty-three per cent. strength with five times its volume of ether. At the parts containing platinum, which, in this instance, is the catalytic agent, the hydrogen peroxid is destroyed by catalytic action with a speed which is a function of the quantity of platinum existing at every part of the original. The picture in hydrogen peroxid thus produced is brought into a solution of Cologne glue, second grade, of ten (10) per cent. strength, to which for every one hundred (100) cubic centimeters has been added from ten (10) to fifteen (15) grams of Cassel's brown and from seven (7) to fifteen (15) grams of a solution of ferrous ammonium sulfate of twenty (20) per cent. strength. After the picture has remained for about a minute in this solution it is washed with water, whereby the glue or coloring-matter is washed away from those places on which there was no hydrogen peroxid, so that a picture of colored coagulated glue remains. In this example the ferrous ammonium sulfate and hydrogen peroxid form together the coagulant of the glutinous matter. Each of said substances constitutes one factor of said coagulant.

Example II: The picture in hydrogen peroxid prepared according to Example I is brought into a solution of glue of ten (10) per cent. strength, to every one hundred (100) cubic centimeters of which has been added from ten to twenty (10 to 20) grams of a solution of ferrous ammonium sulfate of twenty (20) per cent. strength. The picture is kept in this solution for about a minute and is then washed with warm water and brought into water saturated with gallic acid at the ordinary temperature, whereby the picture is colored black. The ferrous ammonium sulfate and hydrogen peroxid perform in this example the same functions as in Example I.

Example III: The colored picture produced according to Example I is brought into a solution of gallic acid saturated at the ordinary temperature. In the foregoing examples the proportions may be varied without varying the nature of the invention. Finally, a similar method may be applied for the multiplication of line-drawings, such as maps or mechanical drawings, by producing the invisible image on a surface prepared with glue, &c., and coloring-matter, on which the coagulation then occurs at the requisite places. The above-described operations, therefore, are conducted in different order.

Example IV: A suitable paper for such multiplication is prepared by coating paper with a solution of gelatin or glue in which a pigment is suspended. This paper is dried and is then ready for use. There is produced thereon in the known manner by aid of catalysis a picture in hydrogen peroxid, and it is then brought into a solution of ferrous sulfate of from ten (10) to twenty (20) per cent. strength, or a solution of some other ferrous salt. There is thus obtained a picture in which the glue has become insoluble. This picture is then developed by treating it either with warm water or a solution of potassium sulfocyanid. The parts where there is no hydrogen peroxid now swell up and by lightly passing a brush over the surface these parts may be removed. In this example the ferrous ammonium sulfate and hydrodgen peroxid constitute the factors of the coagulant of the glutinous matter.

Now what we claim is—

1. The herein-described process of producing pictures, which comprises the steps of bringing a catalytic agent into contact with one factor of a coagulant of glutinous matter and bringing portions of said factor not catalytically affected into reaction with the other factor of said coagulant and subjecting glutinous matter to the action of the reaction product.

2. The herein-described process of producing pictures, which comprises the steps of bringing a catalytic agent into contact with one factor of a coagulant of glutinous matter, bringing portions of said factor not catalytically affected into reaction with the other factor of said coagulant, subjecting glutinous matter to the action of the reaction product, and coloring said glutinous matter.

3. The herein-described process of producing pictures, which comprises the steps of bringing a platinum print into contact with hydrogen peroxid, bringing portions of said hydrogen peroxid not catalytically affected into contact with a ferrous salt, and subjecting gelatin to the action of the reaction product.

4. The herein-described process of producing pictures, which comprises the steps of bringing a platinum print into contact with hydrogen peroxid, bringing portions of said hydrogen peroxid not catalytically affected into contact with a ferrous salt, subjecting gelatin to the action of the reaction product, and coloring the gelatin.

In testimony that we claim the foregoing as our invention we have signed our names in presence of two subscribing witnesses.

WILHELM OSTWALD.
OSCAR GROS.

Witnesses:
RUDOLPH FRICKE,
B. H. WARNER, Jr.